United States Patent Office 3,631,146
Patented Dec. 28, 1971

3,631,146
POLYMERIC MATERIALS
Peter James Briggs, John Langshaw Brooks, and David Crawford Eaton, Manchester, England, assignors to Imperial Chemical Industries Limited, London, England
No Drawing. Continuation of application Ser. No. 647,602, June 21, 1967. This application Apr. 15, 1970, Ser. No. 28,207
Claims priority, application Great Britain, June 27, 1966, 27,869/66
Int. Cl. C08g 22/04, 51/62
U.S. Cl. 260—45.75 N                   3 Claims

ABSTRACT OF THE DISCLOSURE

Nickel di(hydrocarbyl) dithiophosphates are included as stabilising agents in polyurethane compositions, particularly foams. The said nickel compounds may be advantageously used in conjunction with a nickel or zinc β-keto-enolate or a zinc di(hydrocarbyl) dithiophosphate.

---

This invention relates to polymeric materials and more particularly to polyurethane materials and methods for their stabilisation.

This application is a continuation of Ser. No. 647,602 filed June 21, 1967 and now abandoned.

It is already known to manufacture polyurethane materials in the form of foams, elastomers, fibres, coatings and adhesives by reacting organic polyisocyanates with organic polyhydroxy compounds. One disadvantage which has been encountered with these products is their tendency to discolour or degrade during preparation and use. The mechanism of this discoloration or degradation is not entirely clear and there may be several contributory causes. Thus, the discoloration or degradation which commonly occurs in the preparation of polyurethanes, especially foams, is undoubtedly associated with the elevated temperatures employed or attained in the highly exothermic reaction and is usually referred to as scorching. High temperature after-treatments also have a deleterious effect. Factors contributing to discoloration or degradation after preparation include the action of light, oxygen and contact with oxides of nitrogen. The total effect of these various influences may be that the polyurethane material develops in time an unattractive deep brown colour.

It has now been found that the discoloration and degradation of polyurethanes may be obviated or minimised by including therein certain nickel compounds or combinations of certain nickel and zinc compounds.

Thus, according to the present invention there is provided a polyurethane containing a nickel di(hydrocarbyl) dithiophosphate or a combination of nickel and zinc compounds selected from di(hydrocarbyl) dithiophosphates and β-keto-enolates wherein at least one of the compounds is a di(hydrocarbyl) dithiophosphate.

The nickel di(hydrocarbyl) dithiophosphate is a nickel salt of an acid having the formula:

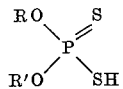

wherein R and R′ are the same or different hydrocarbon radicals or derivatives thereof.

As examples of hydrocarbon radicals or derivatives thereof there may be mentioned alkyl (straight chain or branched), cycloalkyl, aryl, aralkyl radicals and alkyl radicals interrupted by one or more hetero atoms such as O or S.

Alternatively the hydrocarbon radicals or derivatives thereof may together form an alkylene group, optionally substituted with hetero atoms such as O or S, which together with the remainder of the thio acid molecule forms a ring structure containing from 2 to 5 carbon atoms. Furthermore the radicals R and R′ may each be bifunctional alkylene, arylene or alkylene interrupted by heteroatoms such as O or S which each link together two molecules of the thio acid giving rise to a polymeric dihydrocarbyl dithiophosphoric acid.

As examples of the hydrocarbon there may be mentioned ethyl, n-butyl, isopropyl, cyclohexyl, nonyl, phenyl, tolyl, 2-ethyl-hexyl and methoxyethyl.

As examples of alkylene or substituted alkylene radicals which together with the remainder of the thio acid molecule form a ring structure containing from 2 to 5 carbon atoms there may be mentioned ethylene, trimethylene and the radicals —CH$_2$CH$_2$—O—CH$_2$CH$_2$— and

As examples of bifunctional radicals which link two thio acid radicals together there may be mentioned decamethylene, p-phenylene and polyoxyalkylene radicals such as

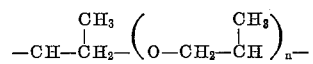

where $n$ represents an integer greater than 1.

As examples of nickel di(hydrocarbyl) dithiophosphates suitable for use in the present invention there may be mentioned nickel dinonyldithiophosphate, nickel di-isopropyldithiophosphate, nickel diphenyldithiophosphate and the nickel salts of the di(hydrocarbyl) dithiophosphoric acids that are the reaction products of phosphorus pentasulphide with polyalkylene ethers of aliphatic monohydric alcohols, for example oxypropylated n-butanol or with polyalkylene plyols such as polypropylene glycol or oxypropylated glycerol.

Mixtures of nickel di(hydrocarbyl) dithiophosphates may also be used in the present invention.

The stabilising effect of the nickel di(hydrocarbyl) dithiophosphates may be enhanced by using the said compounds in conjunction with a zinc di(hydrocarbyl) dithiophosphate or a zinc β-keto-enolate. The protection against discoloration and degradation obtained by the use of such combinations is greater than the sum of the effects due to the individual agents used alone. A similar synergistic effect is obtained by the use of a nickel β-keto-enolate together with a zinc di(hydrocarbyl)dithiophosphate. A nickel β-keto-enolate may also be used together with a nickel di(hydrocarbyl)dithiophosphate. Particularly effective combinations of agents are those containing approximately equal amounts of each agent although mixtures in other proportions are also very useful.

The zinc di(hydrocarbyl)dithiophosphates which may be used according to the present invention are exactly analogous to the nickel di(hydrocarbyl)dithiophosphates already described.

The nickel and zinc β-keto-enolates which may be used according to the present invention are compounds having the formula:

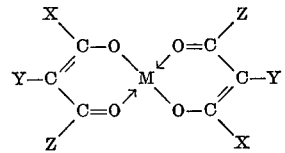

wherein M represents nickel or zinc and X, Y and Z independently represent hydrogen atoms or alkyl, cycloalkyl, aralkyl, aryl, alkoxy or carboalkoxy groups. The aryl groups may optionally be substituted by hydroxyl, alkyl or alkoxy groups or halogen atoms. Alternatively X and Y together may form the residue of an aromatic system, for example phenyl or naphthyl which may optionally be further substituted by hydroxyl, alkyl or alkoxy groups or halogen atoms.

Examples of suitable $\beta$-keto-enolates for use according to the present invention include the nickel and zinc complexes of acetyl-acetone, benzoylacetone, dibenzoylmethane, ethyl acetoacetate, diethyl malonate, salicylaldehyde, 2-hydroxybenzophenone and 2-hydroxy-4-alkoxybenzophenones. Mixtures of $\beta$-keto-enolates may be used.

Suitable amounts of nickel di(hydrocarbyl)dithiophosphates to use according to the present invention are usually in the range of from 0.01% to 5%, and preferably from 0.1% to 2%, by weight based on the weight of the polyurethane. The said combinations of nickel and zinc compounds may be used in similar amounts.

The aforesaid stabilising agents may be incorporated into the polyurethane in any convenient manner. Thus the agents may be incorporated into a polyurethane elastomer by milling or may be added in solution form to a coating composition. It is usually preferred, however, to include the nickel di(hydrocarbyl)dithiophosphates or the aforesaid combinations of agents in the polyurethane-forming reaction mixture. This method of incorporation is particularly suitable where there is a risk of significant discoloration or degradation occurring during the formation of the polyurethane and is usually the most suitable method in the case of a foam.

Accordingly, the present invention provides a process for the manufacture of polyurethanes comprising reacting an organic polyisocyanate with an organic polyhydroxy compound in the presence of a nickel di(hydrocarbyl) dithiophosphate or a combination of nickel and zinc compounds selected from di(hydrocarbyl)dithiophosphates and $\beta$-keto-enolates wherein at least one of the compounds is a di(hydrocarbyl)dithiophosphate.

The starting materials to be used in the preparation of the polyurethanes may be those fully described in the prior art.

Examples of suitable organic polyisocyanates include aliphatic polyisocyanates such as hexamethylene diisocyanate and cycloaliphatic polyisocyanates such as dicyclohexylmethane diisocyanate but the invention is of particular value when aromatic polyisocyanates are used since the problems of discoloration are then much greater. Suitable aromatic polyisocyanates include tolylene-2,4,-diisocyanate,
tolylene-2,6-diisocyanate,
diphenylmethane-4,4'-diisocyanate,
3-methyldiphenylmethane-4,4'-diisocyanate,
m- and p-phenylene diisocyanates,
chorophenylene-2,4-diisocyanate,
naphthalene-1,5-diisocyanate,
diphenyl-4,4'-diisocyanate,
3,3'-dimethyldiphenyl-4,4'-diisocyanate,
diphenyl ether diisocyanate,
2,4,6-triisocyanatotoluene and
2,4,4'-triisocyanatodiphenyl ether.

Examples of other suitable organic polyisocyanates comprise the reaction products of an excess of a diisocyanate with polyhydric alcohols such as trimethylolpropane and uretedione dimers and isocyanurate polymers of diisocyanates, for example of tolylene-2,4-diisocyanate. Mixtures of polyisocyanates may be used, for example mixtures of tolylene 2,4- and 2,6-diisocyanates or the mixtures of polyisocyanates obtained by the phosgenation of crude aromatic amine/formaldehyde reaction products.

Examples of suitable organic polyhydroxy compounds include hydroxyl group-containing polyesters, polyethers, polythioethers and polyacetals.

Suitable hydroxyl group-containing polyesters may be made, for example, from polycarboxylic acids and polyhydric alcohols. Suitable polycarboxylic acids include succinic, glutaric, adipic, sebacic, phthalic, isophthalic, terephthalic and trimesic acids. Mixtures of acids may be used. Examples of polyhydric alcohols include ethylene glycol, propylene glycol, tetramethylene glycol, diethylene glycol, decamethyene glycol, glycerol, trimethylolpropane and pentaerythritol. The polyesters may contain amide groups introduced by including a proportion of diamine or aminoalcohol in the polyester-forming reaction mixture. Suitable diamines and aminoalcohols include ethylene diamine, hexamethylene diamine, tolylene diamines and ethanolamines. The polyesters suitably have molecular weights between 300 and 6000.

Suitable hydroxyl group-containing polyethers may be prepared by the reaction of one or more alkylene oxides with a compound containing a plurality of active hydrogen atoms. Suitable alkylene oxides include ethylene oxide, epichlorohydrin, 1,2-propylene oxide, 1,2-butylene oxide, 2,3-butylene oxide and styrene oxide. Mixtures of two or more oxides may be used if desired, or, as a further variant, the active hydrogen-containing compound may be reacted with two or more alkylene oxides in successive stages, for example using propylene oxide in the first stage and ethylene oxide in the second. Compounds containing a plurality of active hydrogen atoms with which the alkylene oxides may be reacted include water, ammonia, hydrazine, cyanuric acid, phosphorous, phosphoric or phosphonic acids, polyhydroxy compounds, for example ethylene glycol, propylene glycol, diethylene glycol, glycerol, trimethylolpropane, triethanolamine, pentaerythritol, sorbitol, sucrose, phenol-formaldehyde reaction products, resorcinol and phloroglucinol, aminoalcohols, for example monoethanolamine and diethanolamine, polyamines, for example ethylene diamine, hexamethylene diamine, tolylene diamines and diaminodiphenylmethanes and polycarboxylic acids, for example adipic acid, terephthalic acid and trimesic acid. The conditions for the reaction between the alkylene oxide and the active hydrogen containing compound may be those fully described in the prior art using, for example, basic catalysts such as potassium hydroxide or acidic catalysts such as boron trifluoride. The reaction products may have molecular weights of between 300 and 8000 according to the amount of alkylene oxide reacted with the active hydrogen-containing compound.

The problems of discoloration are particularly great in the case of polyurethane foams, where the extremely rapid reaction causes particularly high temperatures to be reached within the foam. Discoloration or scorching is common, therefore, in polyurethane foams and is often especially marked at the centres of large blocks of foam where the heat generated is largely retained because of the insulating properties of the foams themselves. Discoloration with age also is particularly marked in the case of foams. The present invention is valuable as a means of reducing these undesirable effects.

Polyurethane foams may be prepared by reacting the organic polyisocyanate with the organic polyhydroxy compound in the presence of a blowing agent. Alternatively, a prepolymer may be formed by carrying out at least part of the reaction between the polyisocyanate and the polyhydroxy compound in one stage and then introducing the blowing agent subsequently.

Blowing agents which may be used in the process of the present invention include water which reacts with isocyanate groups forming carbon dioxide. Amounts of water which may be used are from 0.5 to 10% based on the weight of polyhydroxy compound. Other blowing agents which may be used include inert low boiling-point liquids which vaporize under the influence of the exothermic reaction.

Suitable low boiling-point liquids are liquids that are inert towards the organic polyisocyanate and have boiling points not exceeding 75° C. at atmospheric pressure and preferably between −40° C. and 50° C. Examples of such liquids are halogenated hydrocarbons such as methylene chloride, vinylidene chloride and particularly fluorinated hydrocarbons such as trichloromonofluoromethane, dichlorodifluoromethane, dichloromonofluoromethane, monochlorodifluoromethane, dichlorotetrafluroethane, 1,1,2-trichloro-1,2,2-trifluoroethane, dibromofluoromethane and monobromodifluoroethane. Mixtures of these low boiling-point liquids one with another and/or with other substituted or unsubstituted hydrocarbons may also be used. Such liquids are usually employed in amounts of from 5 to 40% of the weight of polyhydroxy compound.

The preparation of the polyurethane may be carried out using conventional techniques and equipment. The nickel di(hydrocarbyl) dithiophosphate or combination of nickel and zinc compounds may be incorporated in the reaction mixture in the form of a solution or dispersion in one of the reaction mixture ingredients, for example the polyhydroxy compound or the polyisocyanate or in an inert solvent such as dimethylsulphoxide, dimethylformamide or dimethylacetamide.

The effect of the said nickel and zinc compounds may be further enhanced by also using other compounds. Such compounds include phosphites, for example triphenyl phosphite and 1-ethyl-4-phospha-3,5,8-trioxabicyclo[2,2,2]octane, hypophosphites, for example triethylamine hypophosphite, thiophosphites, for example trilauryltrithiophosphite, thioethers, for example dilaurylthiodipropionate, phenolic antioxidants, for example 2-(α-methylcyclohexyl)-4,6-dimethylphenol, tertiary butyl catechol, propyl gallate, 2,2'-thiobis(4-methyl-6-tertiary butylphenol) and 2,6-di-tertiary butyl phenyl-di-n-butyl borate, and light stabilisers, for example 2-hydroxybenzophenones, 2-hydroxyphenylbenztriazoles, α-cyanoacrylates and phenylsalicylates.

If desired there may also be included in the polyurethane-forming reaction mixture a catalyst. Suitable catalysts are well-known in the art and include in particular tertiary amines. Examples of suitable tertiary amines include triethylamine, dimethylethylamine, dimethylethanolamine, dimethylbenzylamine, dimethylcyclohexylamine, dimethylphenylethylamine, tetramethyl-1,3-butanediamine, triethylene diamine, N-alkyl-morpholines, N-alkylpyrrolidines, N-alkylpiperidines, N,N'-dimethyl-4,4'-bipiperidyl and 4-dimethylaminopyridine. Amine salts such as dimethylbenzylamine lactate are also suitable. Other suitable catalysts include non-basic organic compounds of metals, for example dibutyltin dilaurate, dibutyltin diacetate, stannous carboxylates such as stannous octoate and lead carboxylates such as lead acetate and lead octoate. Mixtures of catalysts are often particularly advantageous.

As described fully in the prior art the general methods of preparation of polyurethanes may include the incorporation in the polyurethane-forming mixture of various additives such as surface-active agents, for example, oxyethylated fatty alkyl phenols, oxyethylated fatty alcohols, salts of sulphuric acid derivatives of high molecular weight organic compounds and alkyl and aryl polysiloxanes and copolymers thereof with alkylene oxides, foam-stabilising agents, for example ethyl cellulose, colouring matters, plasticisers, for example dialkyl phthalates and flame-proofing agents, for example tris-β-chloroethylphosphate and tris-chloropropyl phosphate.

The invention is illustrated but not limited by the following examples in which the parts are by weight.

EXAMPLE 1

To 100 parts of an oxypropylated glycerol of molecular weight approximately 3000 and hydroxyl value 56 mg. KOH/g. is added 0.5 part of nickel bis(acetylacetone) and 0.5 part of zinc dinonyl dithiophosphate. To this mixture is then added 4.6 parts of a solution comprising 3.5 parts of water, 1 part of a siloxaneoxyalkylene copolymer and 0.1 part of triethylenediamine and then 0.3 part of stannous octoate. 44.5 parts of an 80:20 mixture of tolylene-2,4- and 2,6-diisocyanates are rapidly stirred into the blend and the mixture is poured into a mould.

The resultant foam is then compared with a control foam of the same formulation from which the stabilising additive has been omitted. After 4 weeks' exposure to daylight the control sample is of an orange-brown hue whereas that containing nickel bis-acetylacetonate and zinc dinonyldithiophosphate is very pale yellow. Similar results are obtained after 36 hours' irradiation from a mercury lamp. Samples of the two above foams measuring approximately 3" x 1" x 1" are placed in a desiccator of 10" internal diameter. The desiccator is evacuated and 5 ml. nitrogen dioxide gas are admitted followed immediately by sufficient air to regain atmospheric pressure within the desiccator. The foam containing the nickel acetyl acetonate and zinc dinonyldithiophosphate assumes a light brown orange hue whereas the control sample becomes a much darker orange-brown.

Results using other stabilisers as described generally above are tabulated below. In each case foam formulations of tests used are identical with those described above.

| Foam No. | Additions | Parts by weight used | Colour of foam after— | | Treatment with NO$_2$ |
|---|---|---|---|---|---|
| | | | 1 week's daylight | 36 hrs. UV irradiation (mercury lamp) | |
| Control | None | | Light orange-brown | Light orange-brown | Dark orange-brown. |
| 2 | Ni diisopropyl dithiophosphate | 0.5 | V. pale-yellow | Colourless | Light brown orange. |
| 3 | {Zinc dinonyldithiophosphate<br>Nickel bis(acetylacetonate)<br>2-(α-methylcyclohexyl)-4,6-dimethylphenol} | 0.5<br>0.5<br>0.5 | Almost colourless | do | Do. |
| 4 | Ni dicyclohexyldithiophosphate | 0.5 | do | do | Do. |
| 5 | Ni diphenyldithiophosphate | 0.5 | V. pale-yellow | Almost colourless | Do. |
| 6 | Ni di(C$_2$H$_5$OCH$_2$CH$_2$OCH$_2$CH$_2$)dithiophosphate | 0.5 | Almost colourless | Colourless | Do. |
| 7 | Ni di(CH$_3$(OCH$_2$ĊH)$_3$)dithiophosphate<br>(where CH$_3$ branch shown) | 0.5 | do | do | Do. |
| 8 | Ni dinonyldithiophosphate | 0.5 | do | do | Do. |
| 9 | {Ni dinonyldithiophosphate<br>Zn dinonyldithiophosphate} | 0.25<br>0.25 | do | do | Dol. |
| 10 | {Ni diisopropyldithiophosphate<br>Ni bis(ethylacetoacetate)} | 0.25<br>0.25 | do | do | Do. |
| 11 | {Ni bis(benzoylacetone)<br>Zn diisopropyldithiophosphate} | 0.25<br>0.25 | do | V. pale yellow | Do. |
| 12 | {Ni dicyclohexyldithiophosphate<br>Zn bis(acetylacetone)} | 0.25<br>0.25 | do | do | Do. |

EXAMPLE 2

2014 parts of a polyethylene adipate having hydroxy value of 54.3 mg. KOH/g. and acid value 1.62 mg. KOH/g., 1325 parts of diphenylmethane-4,4'-diisocyanate and 2.0 parts of adipic acid are heated together at 80° C. for 1 hour and cooled to give 3339 parts of a liquid prepolymer A.

3000 parts of prepolymer A are subsequently reacted at 85° C. with 317 parts of 1,4-butanediol to give a liquid composition which rapidly solidifies to a brittle white opaque product. This product is stoved in air at 110° C. for 24 hours to give a tough elastomeric material of a light yellow colour.

A repeat preparation of 3316 parts of the prepolymer A which contains 2.0 parts of nickel bis(ethoxyethoxyethyl) dithiophosphate is subsequently reacted with 350 parts of 1,4-butanediol according to the above conditions to give a white product whose colour remains unchanged on stoving in air at 110° C. for 24 hours.

Samples of the above materials with and without stabiliser are partly masked and irradiated by a mercury lamp for 36 hours. The sample with stabiliser becomes a very pale yellow colour whereas the control sample becomes relatively a much deeper brown shade.

EXAMPLE 3

100 parts of a polyester prepared by reacting 228 parts of adipic acid, 177 parts of diethylene glycol and 8.16 parts of pentaerythritol and having a hydroxyl value of 67 mg. KOH/g. and an acid value of 5 mg. KOH/g. are mixed with 47 parts of a 65:35 mixture of tolylene-2,4- and 2,6-diisocyanates. To this mixture is added with vigorous stirring an activator mixture consisting of 5 parts of water, 0.6 part of N,N-dimethyl cyclohexylamine, 1- part of a condensate of octylphenol with approximately 7.5 molecular proportions of ethylene oxide, 0.2 part of the disodium salt of sulphated polypropylene glycol (molecular weight approximately 2000) and 0.3 part of a condensate of castor oil fatty acids with 2.5 molecular proportions of ethylene oxide. At the commencement of foaming the reaction mixture is poured into a mould were a flexible foam is formed.

Further foams are then prepared as described above but also including in the reaction mixture an anti-scorching agent in the proportions stated in the following table. Sodium hypophosphite is incorporated as a solution in the water used in the reaction. Tertiary butyl catechol and nickel dinonyldithiophosphate are incorporated in the polyester resin.

Pieces of foam approximately 1 inch square and 3 inches long are cut from each foam and heated in an oven at 180° C. for 1 hour. The table below describes the appearance of the foams after this treatment. All the foams are colourless before being heated.

| Additive | Parts by wt. per 100 parts of resin | Appearance of foam after heating 1 hr. at 180° C. |
| --- | --- | --- |
| None | | Orange-brown. |
| Ni dinonyldithiophosphate | 0.1 | Pale yellow. |
| Tert. butyl catechol | 0.1 | Orange-brown. |
| Tert. butyl catechol | 0.05 | Very pale yellow. |
| Ni dinonyldithiophosphate | 0.05 | |
| Na hypophosphite | 0.05 | Almost colourless. |
| Ni dinonyldithiophosphate | 0.05 | |

EXAMPLE 4

To 100 parts of a solution (having an NCO content of 2.5% and a viscosity of 2.5 poises at 25° C.) of 50 parts of a moisture-curing prepolymer derived from a saturated polyester polyol and toluene diisocyanate in 50 parts of a mixture of butyl acetate and 4-methyl-4-methoxypentan-2-one was added 0.5 part of nickel dinonyldithiophosphate. The resultant solution was spread in a film of thickness 0.003 inch on a glazed white tile and left to cure in the atmosphere for twelve hours. The cured film was partially masked and then exposed to a mercury lamp for 24 hours when it was found that both the exposed and unexposed parts presented an identical appearance.

A film was similarly prepared from which the nickel additive was omitted and subjected to the same exposure from the mercury lamp. The unmasked part of this film was found to be distinctly discoloured to a yellow shade compared with the masked part which was unaffected.

What is claimed is:

1. A stabilized polyurethane containing a stabilzer comprising 0.01 to 5 percent by weight of a member selected from the group consisting of (1) a nickel salt of a dithiophosphoric acid of the formula

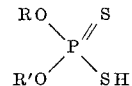

wherein R and R' each independently are selected from the group consisting of alkyl, cycloalkyl and aryl radicals having up to 9 carbon atoms, and an alkyl polyoxyalkylene radical containing up to 10 carbon atoms and up to 3 oxalkylene residues and (2) a combination of a nickel β-ketoenolate selected from the group consisting of nickel bis (acetylacetone), nickel bis (ethylacetoacetate) and nickel bis (benzoylacetone), and zinc salt of said dithiophosphoric acid.

2. The stabilized polyurethane of claim wherein said stabilizer is said nickel salt of said dithiophosphoric acid in combination with a zinc salt of said dithiophosphoric acid.

3. The stablized polyurethane of claim 1 wherein said stabilizer is said nickel salt of said dithiophosphoric acid in combination with a zinc bis (acetylacetone).

References Cited

UNITED STATES PATENTS

| 3,499,869 | 3/1970 | Lappin et al. | 260—45.57 |
| 3,377,322 | 4/1968 | Witsiepe | 260—77.5 |
| 3,245,923 | 4/1966 | Manzella et al. | 260—2.5 |
| 3,193,525 | 7/1965 | Kallert et al. | 260—45.9 |
| 2,786,044 | 3/1957 | Warner et al. | 260—45.75 X |
| 3,179,627 | 4/1965 | Twitchett | 260—45.75 |

FOREIGN PATENTS

| 872,094 | 7/1961 | Great Britain | 260—45.75 Ni |
| 1,188,277 | 3/1965 | Germany | 260—2.5 AI |

DONALD E. CZAJA, Primary Examiner

C. W. IVY, Assistant Examiner

U.S. Cl. X.R.

260—2.5 BB, 45.7 P, 45.75 R, 45.8 N, 45.95